Sept. 3, 1968 R. E. CLINE 3,399,717
THERMAL SWITCH
Filed Dec. 27, 1966
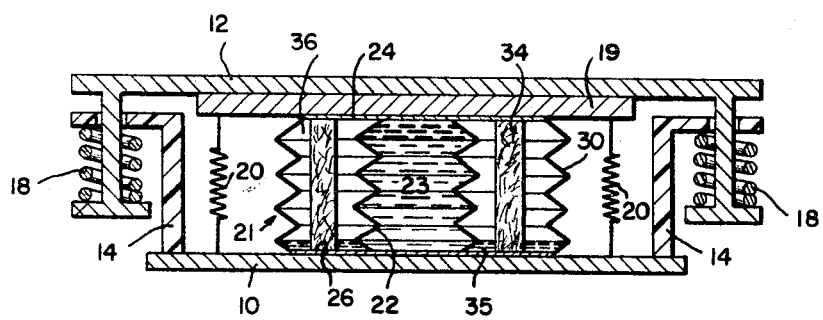
Ronald E. Cline,
INVENTOR.
BY.
*Alfons Valukonis*
AGENT.

United States Patent Office 3,399,717
Patented Sept. 3, 1968

3,399,717
THERMAL SWITCH
Ronald E. Cline, Woodland Hills, Calif., assignor to TRW Inc., Redondo Beach, Calif., a corporation of Ohio
Filed Dec. 27, 1966, Ser. No. 604,957
8 Claims. (Cl. 165—32)

ABSTRACT OF THE DISCLOSURE

Briefly, this disclosure relates to a thermal switch incorporating heat pipe thermal flow control. A thermal switch is a device which provides a variable thermal conductance and is generally temperature actuated. Thermal switches use various actuation devices, such as for example, bimetals, expanding fluids, and the expansion of materials undergoing a phase change are the most common. However, almost all such switches use flexible metal conductors for heat transfer. This disclosure teaches the use of a heat pipe as a heat transfer medium. The heat pipe assembly incorporates an expansible chamber containing a capillary element and a quantity of liquid sufficient to keep the capillary element wet and a saturated vapor atmosphere within the chamber over a predetermined range of temperatures. Many liquids can be used but pure water which is deionized and distilled is preferred. The water boils at the hot surface of the heat pipe thus absorbing heat from the hot surface. Vapor is condensed at the cold surface which completes the transfer of heat from the hot surfaces to the heat sink. The water condensed at the cold surface is then transferred by capillary action of the capillary element to the hot surface. This device operates in any attitude and its operation is independent of gravity or ambient pressure.

Background of the invention (1) *Field of the invention.*—This invention relates to heat transfer control apparatus, and more particularly relates to a thermal switch capable of transferring heat from a body to a heat sink.

(2) *Description of the prior art.*—In most spacecraft applications large variations in the thermal environment of the spacecraft, such as the occurrence of an eclipse, or in the power dissipated by spacecraft components, is to be expected. When the heat to be transferred from a component or an area of the spacecraft changes drastically this usually results in a large temperature change. However, many spacecraft applications dictate that temperature changes be minimized, which in turn requires that the change in heat flow be made up for by a change in electrical power dissipation, as by heaters, or by a change in component thermal properties. Generally, component thermal properties are usually either changed by varying the radiative properties of the components by means of louvers, or the like, or by means of thermal conductance devices such as thermal switches. Thermal switches have a larger ratio of maximum to minimum heat transfer capability than do louvers and are preferably for use in many applications. A thermal switch is a device which is capable of providing variable thermal conductance, and is generally temperature actuated. Prior thermal switch devices utilize various common actuating means, such as bimetals, expanding fluids, and materials undergoing a phase change. Also, most prior art devices use metal conductors as the actual heat transfer medium. One such device is described and claimed in copending U.S. patent application Ser. No. 589,056, filed Oct. 24, 1966, and assigned to the assignee of the invention. In that application there is described a heat switch for selectively transferring heat between a heat source and a heat sink wherein there is provided an expandable fluid container in heat transfer relationship to the heat source and which contains a fluid adapted to expand the container when the fluid is heated. Heat transfer means in the form of a metal conductor is adapted to transfer heat from the heat source to the heat sink when the fluid reaches a predetermined temperature.

Another example of a prior art thermal switch of the type described above, which uses bimetallic elements is U.S. Patent No. 3,177,933. Still another example of a switch wherein expanding mercury is used is the U.S. Patent No. 3,229,755. U.S. Patent No. 3,225,820 reveals devices wherein bimetallic elements, and bellows containing expansible fluid are used.

In prior thermal switches wherein metal thermal conductors in the form of flexible foils or wires, or the like, are utilized, experiments conducted on such devices reveal that approximately half of the undesirable resistance to heat transfer is caused by the metal conduction.

Summary of the invention

Briefly, in accordance with this invention apparatus is provided for the control of heat flow from a heat source to a heat sink which has means defining an expansible chamber between the heat source and the heat sink. A vaporizable fluid is contained in the chamber, and a means defining a capillary fluid flow path between the heat source and the heat sink is located in the chamber.

The device of the present invention has the advantage that it will operate in any attitude, independently of gravity or ambient pressure, and thus is suitable for use in a great many heat transfer applications. Moreover, the disadvantages of prior art devices are not present in this invention particularly since metal conductors are not utilized but incorporates a two phase fluid in a small flexible container means, which provides for increased heat transfer capability and a reduction in over-all weight.

Brief description of the drawing

The sole figure in the drawing is a view partially in cross-section of one embodiment of the present invention.

Description of the preferred embodiment

Reference is now made to the sole figure of the drawing wherein one embodiment of the invention is shown. The numeral 10 indicates a source of heat such as a wall, and the numeral 12 indicates a heat sink wall. A pair of similar rigid members 14 formed from heat insulation material are suitably secured to the wall 10 as by bonding. The members 14 can be fashioned from Fiberglas or similar thermal insulating material. A pair of similar overload springs 18 are provided between the heat sink wall 12 and the members 14. A heat conducting plate 19 is biased toward the heat wall 10 as by means of springs 20 so that normally it is separated from the heat sink wall 12.

A heat transfer assembly 21 is adapted to be positioned between the heat wall 10 and the plate member 19, as shown and consists of an inner bellows 22 connected at one end to a plate member 24 and to a plate member 26 at the other end. The bellows 22 is preferably filled with a heat expandable fluid 23 such as, for example, ethyl alcohol at a predetermined temperature $T_1$. An outer bellows 30 envelops the bellows 22, and is also connected at its ends to the plates 24 and 26. The plates 24 and 26 are adapted to be connected as by bonding to the plate 19 and wall 10, respectively. A capillary element 34 and a two phase fluid 35 are provided within the expansible chamber 36 formed by the bellows 22 and 30.

The capillary element 34 is preferably a flexible wick, generally cylindrical in shape, and fashioned from flexible fibers made of such material as felt. It will be apparent that the wick 34 could be a quantity of metal fibers, or a screen, for example, of wire mesh, several layers thick. The wick 34 is preferably fastened at its ends by suitable means to the plate members 24 and 26 so that good thermal contact is assured therebetween, and hence to the heat source 10 and heat sink 12.

The fluid 35 is preferably deionized distilled water, but many other fluids are suitable for use as will be apparent to those skilled in the art. Initially, after a vacuum has been provided in chamber 36, the fluid 35 is introduced into the chamber in a liquid state, for example, at the predetermined temperature $T_1$ and in sufficient quantity to maintain the wick 34 wet and a saturated vapor atmosphere in the chamber over the entire operating temperature range of the thermal switch from the lower temperature $T_1$ to a maximum desirable upper temperature limit $T_2$.

In operation, assuming that the fluid 23 in bellows 22 has expanded due to a temperature increase to some value between $T_1$ and $T_2$, to the extent that a sufficient overriding of the force exerted by the bias springs 20 is achieved, and the plate member 19 is in actual contact with the wall 12, as shown. At the warm end of the heat transfer assembly 21 the fluid 35 between the bellows 22 and 30 absorbs heat equal to its heat of vaporization from the wall 10 such that it boils and is evaporated from the wick 34 and adjacent chamber surfaces. The vapor travels through the length of the vapor space 36 and into contact with the cooler end of the assembly 21. Condensation then occurs, the fluid 35 giving up the heat absorbed at the wall 10 to the cool end member 24. This heat is then transferred to the heat sink wall 12 by means of the heat conducting plate member 19. The condensed fluid is then absorbed by the wick 34 and travels through to the warm end of the assembly 21 where it is evaporated to begin anew the hereinbefore mentioned cycle. If excess expansion of the fluid 23 takes place, the override springs 18 absorb the excessive expansion thus preventing damage to the bellows 22 and 30.

Although a preferred embodiment of the invention has been described it is to be understood that the invention is not limited to the illustrative example but may be accomplished by numerous devices as will be apparent to those skilled in the art.

I claim:

1. A thermal switch for controlling flow of heat from a heat source and a heat sink comprising:
    inner and outer bellows defining an expansible chamber having ends positionable in heat transfer relationship between the heat source and the heat sink, said inner bellows containing a heat expandable fluid;
    a vaporizable fluid in said chamber; and
    means defining a capillary fluid flow path in said chamber between said ends.

2. The thermal switch of claim 1 wherein said vaporizable fluid comprises water.

3. The thermal switch of claim 1 wherein said capillary fluid flow path comprises a wick.

4. The thermal switch of claim 3 wherein said wick comprises a flexible fiber material.

5. The thermal switch of claim 4 wherein said fiber material is felt.

6. The thermal switch of claim 2 wherein said water is deionized and distilled.

7. The thermal switch of claim 1 wherein said heat expandable fluid comprises ethyl alcohol.

8. A thermal switch for controlling flow of heat from a heat source and a heat sink comprising:
    inner and outer bellows defining a space therebetween said bellows being provided with end members positionable between the heat source and heat sink in heat transfer relationship therewith;
    alcohol filling said inner bellows;
    a flexible felt wick in said space interconnecting said end members of said bellows; and
    deionized distilled water wetting said wick and providing a saturated vapor atmosphere in said space over a predetermined temperature range.

References Cited
UNITED STATES PATENTS

| | | | |
|---|---|---|---|
| 3,152,774 | 6/1963 | Wyatt | 244—1 |
| 3,225,820 | 12/1965 | Riordan | 165—32 X |
| 3,229,755 | 1/1966 | Komarow | 165—32 |
| 3,229,759 | 1/1966 | Grover | 165—105 |
| 3,330,130 | 7/1967 | Schraith et al. | 62—119 X |
| 3,332,476 | 7/1967 | McDougal | 165—105 X |

ROBERT A. O'LEARY, *Primary Examiner.*

A. W. DAVIS, *Assistant Examiner.*